(12) United States Patent
Ferguson et al.

(10) Patent No.: US 7,275,211 B2
(45) Date of Patent: Sep. 25, 2007

(54) RENDERING PAGE SETS

(75) Inventors: Kevin Ferguson, Manotick (CA); Wael Amer, Ottawa (CA)

(73) Assignee: Cognos Incorporated, Ottawa, Ontario (CA)

(*) Notice: Subject to any disclaimer, the term of this patent is extended or adjusted under 35 U.S.C. 154(b) by 329 days.

(21) Appl. No.: 10/883,890

(22) Filed: Jul. 2, 2004

(65) Prior Publication Data

US 2006/0005116 A1 Jan. 5, 2006

(51) Int. Cl.
*G06F 15/00* (2006.01)
(52) U.S. Cl. .................. 715/517; 715/530; 715/537
(58) Field of Classification Search ............ 715/517, 715/530, 537
See application file for complete search history.

(56) References Cited

U.S. PATENT DOCUMENTS

| | | | | |
|---|---|---|---|---|
| 5,664,182 | A * | 9/1997 | Nierenberg et al. ......... 707/102 |
| 5,893,127 | A * | 4/1999 | Tyan et al. ................. 715/513 |
| 6,055,544 | A * | 4/2000 | DeRose et al. ........... 707/104.1 |
| 6,320,586 | B1 | 11/2001 | Plattner et al. |
| 6,377,704 | B1 * | 4/2002 | Cooperman ................. 382/176 |
| 6,460,031 | B1 | 10/2002 | Wilson, III et al. |
| 6,657,647 | B1 | 12/2003 | Bright |
| 6,845,483 | B1 * | 1/2005 | Carroll ....................... 715/513 |
| 6,971,062 | B1 * | 11/2005 | Tolpin ........................ 715/537 |
| 7,051,276 | B1 * | 5/2006 | Mogilevsky et al. ....... 715/517 |
| 2002/0169803 | A1 * | 11/2002 | Sampath et al. ............ 707/513 |
| 2002/0196467 | A1 * | 12/2002 | Delhoune et al. .......... 358/1.18 |
| 2004/0088334 | A1 * | 5/2004 | Klein ......................... 707/203 |
| 2004/0194028 | A1 * | 9/2004 | O'Brien ..................... 715/517 |
| 2004/0205513 | A1 * | 10/2004 | Chen et al. ............... 715/501.1 |
| 2004/0255233 | A1 * | 12/2004 | Croney et al. ............. 715/500 |
| 2004/0255244 | A1 * | 12/2004 | Filner et al. ............... 715/517 |
| 2005/0091576 | A1 * | 4/2005 | Relyea et al. .............. 715/502 |

OTHER PUBLICATIONS

Oracle Report Building Reports, "Basic Concepts", pp. 1-41, Copyright 2002/2003, Available Online at: http://www.comp.hkbu.edu.hk/docs/o/dl/bi/B10602_01/orbr_concepts1.htm.*
Cognos Products: Overview (website), "Software that delivers the next level of performance Integrated planning, scorecarding, and business intelligence software", 2 pages, Jul. 6, 2004.
Cognos Enterprise Planning Series (website), "Enterprise Performance: Lay a solid performance foundation with enterprise planning", 2 pages, Jul. 6, 2004.
Cognos Products: Cognos® Metrics Manager Overview (website), "Enterprise Scorecarding: Communicate a common set of priorities to monitor your performance", 2 pages, Jul. 6, 2004.
Cognos Enterprise Business Intelligence (website), "Enterprise Business Intelligence: Understand your business and make better decisions with the industry's most comprehensive business intelligence", 2 pages, Jul. 6, 2004.

* cited by examiner

*Primary Examiner*—Doug Hutton
*Assistant Examiner*—R. Singh
(74) *Attorney, Agent, or Firm*—Pearne & Gordon LLP

(57) ABSTRACT

Method and system for rendering a page set having logical pages into a physical report output page. The logical pages may have implicit or explicit repeating orders, implicit or explicit rendering orders; or identification attributes.

24 Claims, 8 Drawing Sheets

|  | Rows (log.) | Rows (phys.) |
|---|---|---|
| Header | 20 | 20 |
| Details | 28 | 30 |
| Footer | 15 | 15 |

Page Set: 100, 102

Figure 5

|  | Rows (log.) | Rows (phys.) (1) | Rows (phys.) (2) |
|---|---|---|---|
| Header | 20 | 20 | 20 |
| Details | 55 | 30 | 25 |
| Footer | 15 | 15 | 15 |

Page Set: 108, 104, 106

RENDERING PAGE SETS

FIELD OF INVENTION

The present invention relates to reporting in business intelligence. More specifically, the present invention relates to rendering page set during the reporting.

BACKGROUND OF THE INVENTION

The ability to act quickly and decisively in today's increasingly competitive marketplace is critical to the success of any organization. As global competitive threats increase, new markets emerge, and new regulatory pressures for financial clarity and accuracy arise, businesses face unprecedented requirements for speed and accuracy in forecasts and plans. The volume of data that is available to organizations is rapidly increasing and frequently overwhelming.

Several new approaches have been created to respond to the new challenges in business performance management: Enterprise planning combines the resources to provide insight into past, current, and future operating performance, enabling managers to spot trends, identify opportunities, and affect outcomes; Monitoring or Scorecarding helps the decision makers to track and analyze key business metrics via scorecards, and provides the direct link to the business intelligence; and Business Intelligence takes the volume of collected and stored data, and turns it into meaningful information that can be used in the day-to-day activities.

Business Intelligence has usually a Reporting component and an Analysis component. Analysis allows end users to interact with multi-dimensional business information and answer ad hoc questions with minimal knowledge of the underlying data sources and structures. Reporting is the process of accessing, formatting, and delivering of stored, collected and processed data.

Reporting is the largest and fastest-growing component of the business intelligence (BI) market. Reporting helps users understand the performance of a business and leads to immediate action on the most recent information. It creates a common context for decision-making.

Reporting provides high-performance engines to merge predefined report templates with large volumes of data to produce, publish and distribute reports to a wide audience of information consumers. Key reporting features for reporting include advanced formatting, multi-pass calculations, bursting, table of contents navigation, on-demand paging, report element security and output to multiple formats (for example, PDF, HTML and Excel).

When a report is generated, it is common to retrieve the data from different databases, aggregate them and display the data in a report. However, data in different databases may be suited for displaying a particular type of data. For example, they are stored as logical header pages for displaying at the header of each page of a report, logical footer pages for displaying at the footer of each page of the report, and details pages for displaying in the middle of a page. A report maybe assembled from one logical header page, one logical details page and one logical footer page. If the logical details page has only one row of data, and a logical page break at the end, the assembled report may have one header, one row of data from the detailed page and a footer. The resulted report output will waste valuable space, on paper or on display.

In addition, same information may exist in different databases, or in different records of the same database, when a report is generated, same information may be presented more than once, for example, sale information may be presented under account and under customer.

Therefore, there is a need for an improved report output of the reporting in business intelligence.

U.S. Pat. No. 6,320,586 describes a computer system with a visual display for data in an interactive split pie chart. The system permits a user to modify the input parameters of the pie chart to dynamically alter the configuration of the chart. An interface is between the computer system and a data storage system to transfer data to be transformed into the graphical rereport output of the pie chart.

U.S. Pat. No. 6,460,031 describes a system for creating and titling reports from a database by using a graphical title bar navigator to create and depict a natural language phrase to query a database and title the resulting report such that the navigator itself becomes the title. A set of parameters embodying the various tables and fields in a traditional database system is provided for selection in a menu by the user. The user selects a first parameter through the navigator. Based on this selection, a further set of parameters is made available, until the specificity of the query has been achieved. Each selection that is made grammatically follows the selection before it such that the navigator depicts a complete sentence in natural language form. The query is communicated from the interface to the database management system which accesses the data. The natural language phrase persists and becomes the title of the report.

U.S. Pat. No. 6,657,647 describes a method in which a main document and referenced frame documents to be rendered by a browser for a display page are parsed by the browser to identify where text and graphics objected are to be located.

SUMMARY OF THE INVENTION

The present invention relates to reporting in business intelligence. More specifically, the present invention relates to rendering page set during the reporting.

According to one aspect of the present invention there is provided a method of rendering a page set having sequential logical pages to generate a report output page comprising the steps of: determining a number of rows for each of the logical pages in the page set; identifying the logical pages as a logical header page, a logical details page or a logical footer page; determining a first number of rows for the report output page; adding the numbers of rows of the logical header page, the logical details page, and the logical footer page to obtain a first sum; rendering the logical pages in a predetermined order, if the first number is greater than or equal to the first sum; adding the rows of the logical header page; and the logical footer page to obtain a second sum; subtracting the second sum from the first number to arrive at a logical details page displaying number; subdividing the logical details page, if the first sum is greater than the first number, into logical details subpages having number of rows corresponding to the logical details page displaying number and a sequential order, resulting a last logical details subpage having a number being smaller than or equal to the logical details page displaying number; rendering the logical header page, logical details subpage, and logical footer page in the predetermined order; and generating the report output page.

According to another aspect of the present invention there is provided a system for rendering a page set having sequential logical pages to generate a report output page comprising: module for determining a number of rows for each of the logical pages in the page set; module for identifying the logical pages as a logical header page, a logical details page or a logical footer page; module for determining a first number of rows for the report output page; module for adding the numbers of rows of the logical header page, the logical details page, and the logical footer page to obtain a first sum; and module for rendering the logical pages in a predetermined order, if the first number is greater than or equal to the first sum; module for adding the rows of logical header page; and logical footer page to obtain a second sum; module for subtracting the second sum from the first number to arrive at a logical details page displaying number; module for subdividing the logical details page, if the first sum is greater than the first number, into logical details subpages having number of rows corresponding to the logical details page displaying number and a sequential order, resulting a last logical details subpage having a number being smaller than or equal to the logical details page displaying number; module for rendering the logical header page, the logical details subpages, and the logical footer page in the predetermined order; module for generating the report output page.

According to another aspect of the present invention there is provided a computer program product comprising; a memory having microcontroller-readable code embedded therein for rendering a page set having sequential logical pages for generating a report output page, the code comprising; code means for determining a number of rows for each of the logical pages in the page set; code means for identifying the logical pages as a logical header page, a logical details page or a logical footer page; code means for determining a first number of rows for the report output page; code means for adding the number of rows of the logical header page; the logical details page; and the logical footer page to obtain a first sum; and code means for rendering the logical pages in a predetermined order, if the first number is greater than or equal to the first sum; code means for adding the rows of the logical header page; and the logical footer page to obtain a second sum; code means for subtracting the second sum from the first number to arrive a logical details page displaying number; and code means for subdividing the logical details page, if the first sum is greater than the first number, into logical details subpages having number of rows corresponding to the logical details page displaying number and a sequential order, resulting a last logical details subpage having a number being smaller than or equal to the logical details page displaying number; code means for rendering the logical header page, the logical details subpage, and the logical footer page in the predetermined order; and code means for generating the report output page.

It is an object of the invention to provide an improved method of rendering a page set.

BRIEF DESCRIPTION OF THE DRAWINGS

These and other features of the invention will become more apparent from the following description in which reference is made to the appended drawings wherein:

FIG. 5 shows an example of a page set with fewer rows in total than a report output page;

FIG. 6 shows an example of a page set with more rows in total than a report output page;

DETAILED DESCRIPTION OF A PREFERRED EMBODIMENT

Figure 1:
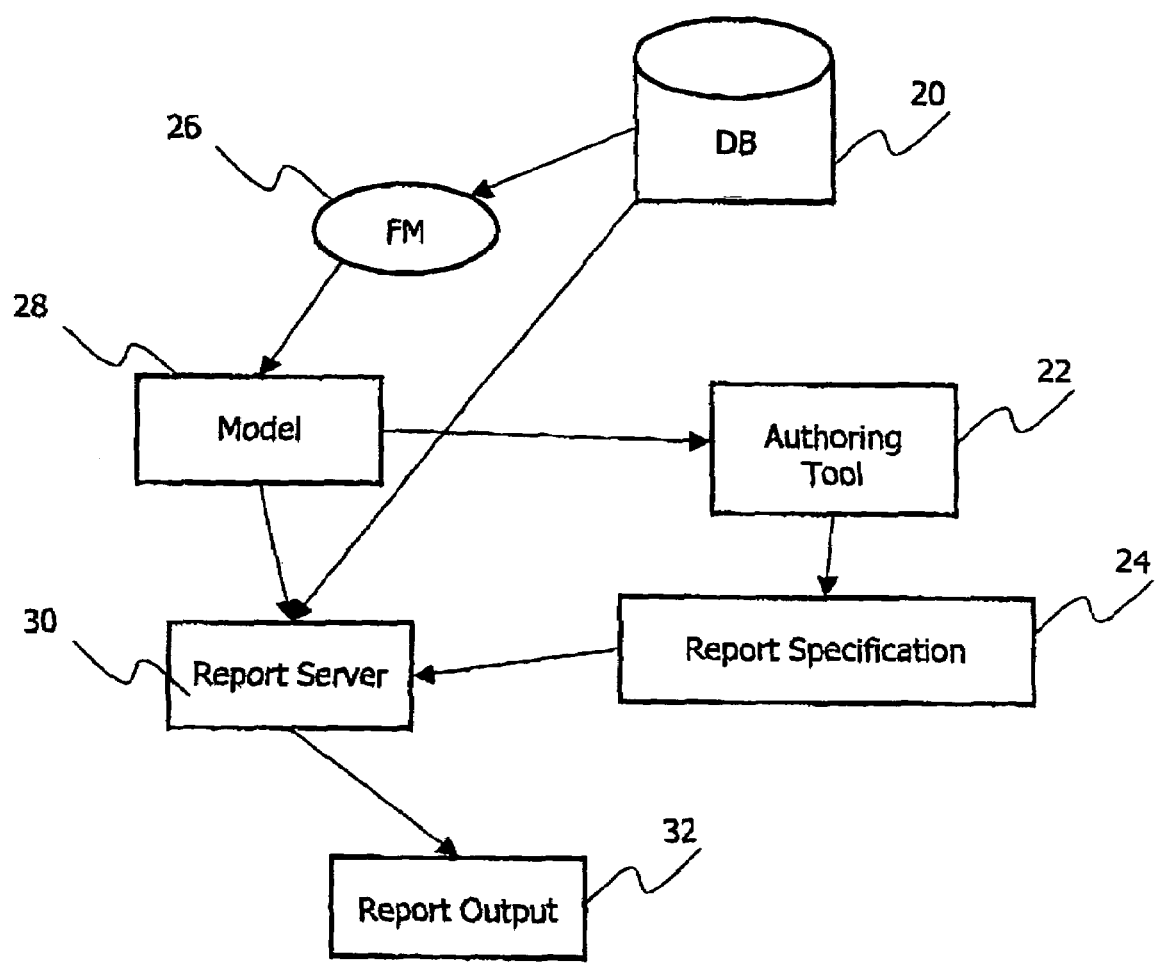
FIG. 1 shows an overview of a process of generating a report output in accordance with an embodiment of the present invention.

FIG. 1 provides a general overview of how a report output page is generated. Arrows indicate the direction of dataflow. Data stored in database (20) is retrieved by a framework manager (26). The framework manager reads structure of tables and columns in database (20), generates relationships between tables, adds additional queries, calculations, conditions and run-time value prompts, builds and publishes a model (28) comprising these definitions for consumption by an authoring tool (22) and a report server (30). The authoring tool (22) uses the model (28) as a table of database contents from which to build a report specification (24). The report server (30) uses the model (28) to generate SQL and MDX queries from the report specification (24). The report specification (24) generated by the authoring tool (22) specifies how a report server (30) is executed to render one or more than one pages of report output (32). A rendering engine in the report server (30), for example, uses the model (28) to generate SQL and MDX queries from the report specification. These queries are executed against the database and data values are returned. Retrieved data values are formatted and arranged according to the layout definitions in the report specification (24), and then rendered to the user as pages of report output (32).

A report output, as used in embodiments of this invention, can be one of, but not limited to: a printed paper page, an HTML web page, a file encoded in one of the markup languages for report output though a computer application, a page presented on a display or one of the encapsulated file types such as PostScript™, or PDF.

Rendering is the process of utilizing the information stored in a database to produce the report output (32) from the authored report specification (24). The report specification can be considered as a template for the report output that defines everything that is needed to produce the report output except the data. Building this template is known as "authoring" the report specification. The rendering process merges this template with the data values returned from the database in order to generate the desired report output.

Figure 2:
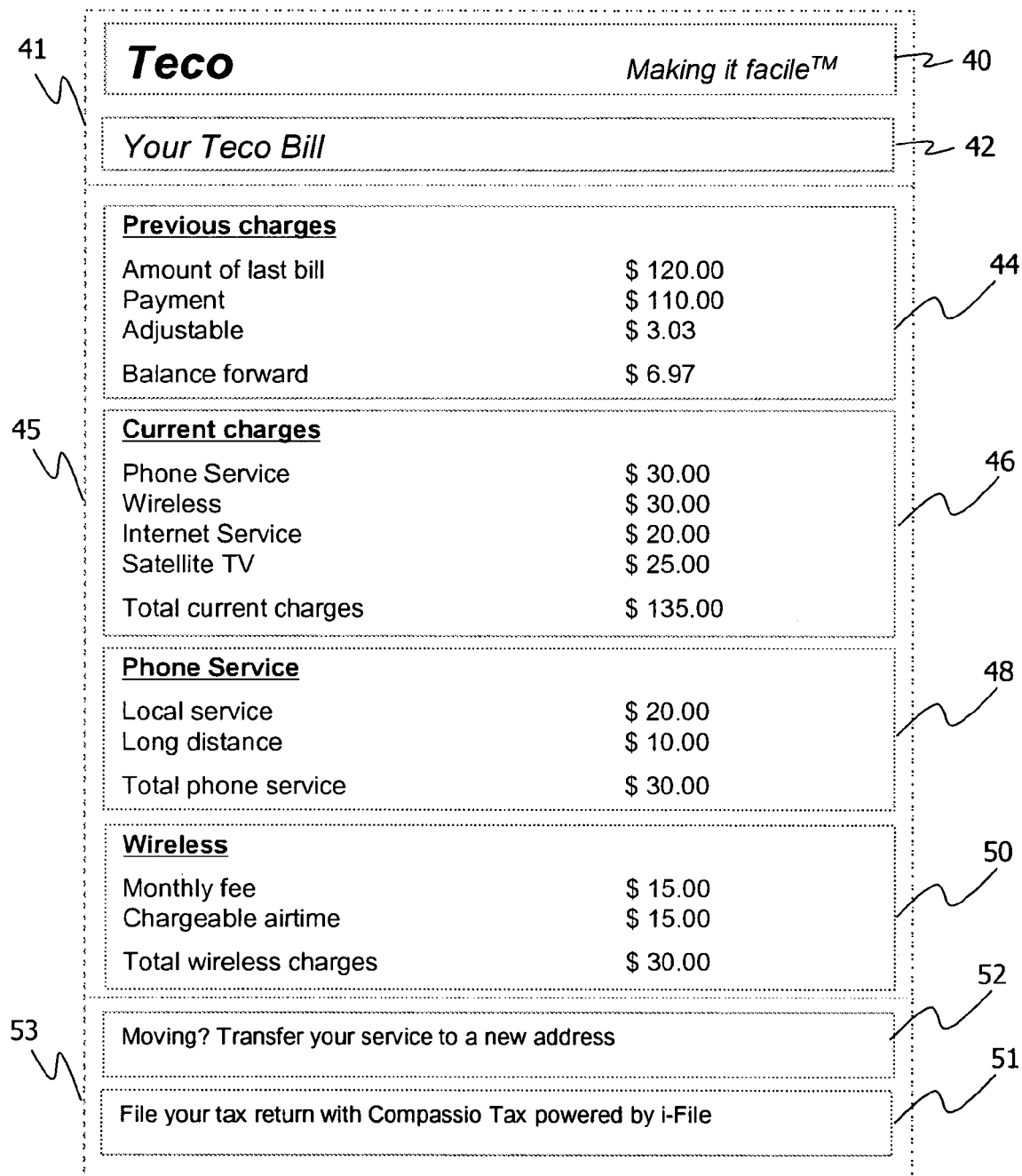
FIG. 2 shows an example of a telephone bill as a generated report.

Although the method and its implementation can be used in many areas of information presentation, particularly for concise, timely and accurate presentation of the vast and complex information available in business intelligence, the layout of a report output is described by using an example of a utility bill as illustrated in FIG. 2. The underlying principles described here can be easily adapted to other presentation formats as mentioned above.

Referring to FIG. 2, a report output such as a utility bill can be divided into three parts: a header section (41), a details section (45) and a footer section (51). The header section (41) comprises one or more than one fields (40, 42), in this example, one field (40) has the logo and a tagline, the other field (42) indicates that it is a bill. The details section (45) also has one or more than one fields (44, 46, 48, and 50). In FIG. 2, the field (44) lists previous charges for the account, the field (46) shows the current services provided and the charges for those services. Fields (48, 50) list detailed charges for two services in field 46. Following the details section there is the footer (51) which comprises two fields (52, 54). In this example the two fields (52, 54) in the footer (51) are used for advertising other services.

The information in the fields is rendered by the report server or rendering engine by using the information contained in the database (20). Using the utility bill example in FIG. 2, a second page is needed to display the detailed information about charges for Internet services and Satellite TV charges listed on 46. The fields (48, 50) in the details section (45) have more detailed information than fields 44 and 46. As the details section continues, an even more detailed field may still be provided, for example, under the long distance in Phone Service (48) the numbers called could be displayed. The different fields in the header and footer makes a selective displaying of the information possible, for example, on second page of the bill in FIG. 2, fields 40, and 54 may be absent.

Figure 3:
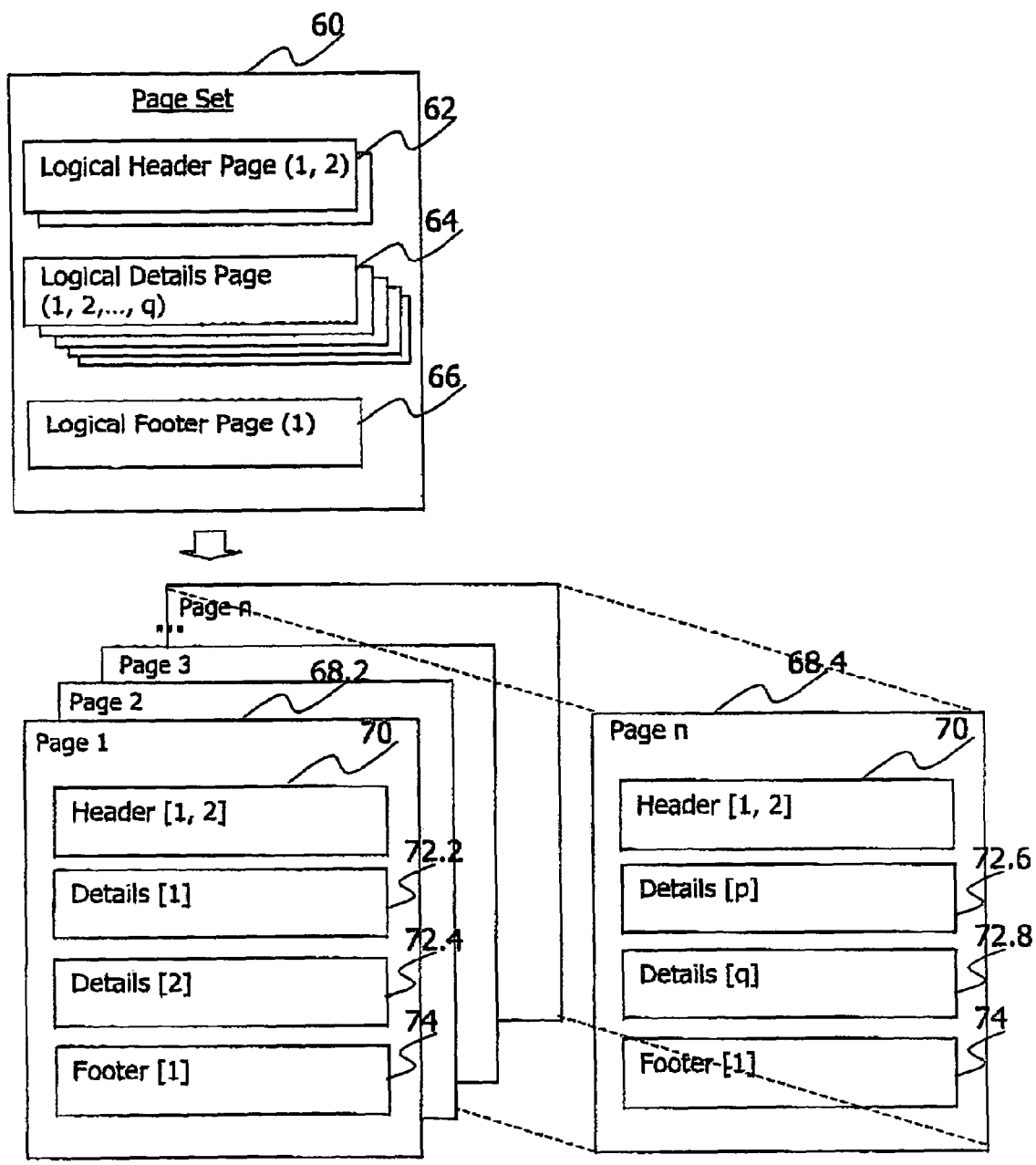
FIG. 3 is a schematic report output of a page set; and a rendered report.

The data used for rendering information from the database (20) to a report output can be, for example, stored in a page set. Referring to FIG. 3, a page set (60) is an entity comprising a set of logical pages (62, 64, and 66). It may also comprise an implicit or an explicit rendering order, and an implicit or an explicit repeating order (not shown in FIG. 3). In FIG. 3, the page set (60) has two logical header pages (62), q logical details pages (64) and one logical footer page (66). Pages 68.2 and 68.4 in FIG. 3 are report outputs that display the information.

If the page set (60) comprises an explicit repeating order, the logical header pages (62), the logical details pages (64) and the logical footer page (66) are repeated as per repeating order in the page set, for example, the two logical header pages (62) and the logical footer page are repeated on every report output page (70, 74), while the details pages are only displayed once on the report output pages (72.2, 72.4, 72.6, and 72.8).

Similarly, when the page set (60) comprises an explicit rendering order, the report output page may have a different order of the logical pages than the order in the page set. For example, details page [2] (72.4) in FIG. 3 could be displayed on report output page 3 as per explicit rendering order in the page set (not shown).

When a report is generated, data can be retrieved from different databases, aggregated and displayed in a report. However, data in different databases may be suited for displaying as a particular type of data with no prediction as how different data types are to be combined. For example, data are stored as logical header pages for displaying as the header of each report output page, logical footer pages for displaying at the footer of each report output page, and details pages for displaying in the middle of each report output page. A report may be assembled from one logical header page, one logical details page and one logical footer page. If the logical details page has only one row of data, and a logical page break at the end, the report output page may have one header, one row of data from the detailed page and a footer. Consequently, the resulted report output would waste valuable space, on paper or on display.

Figure 4:
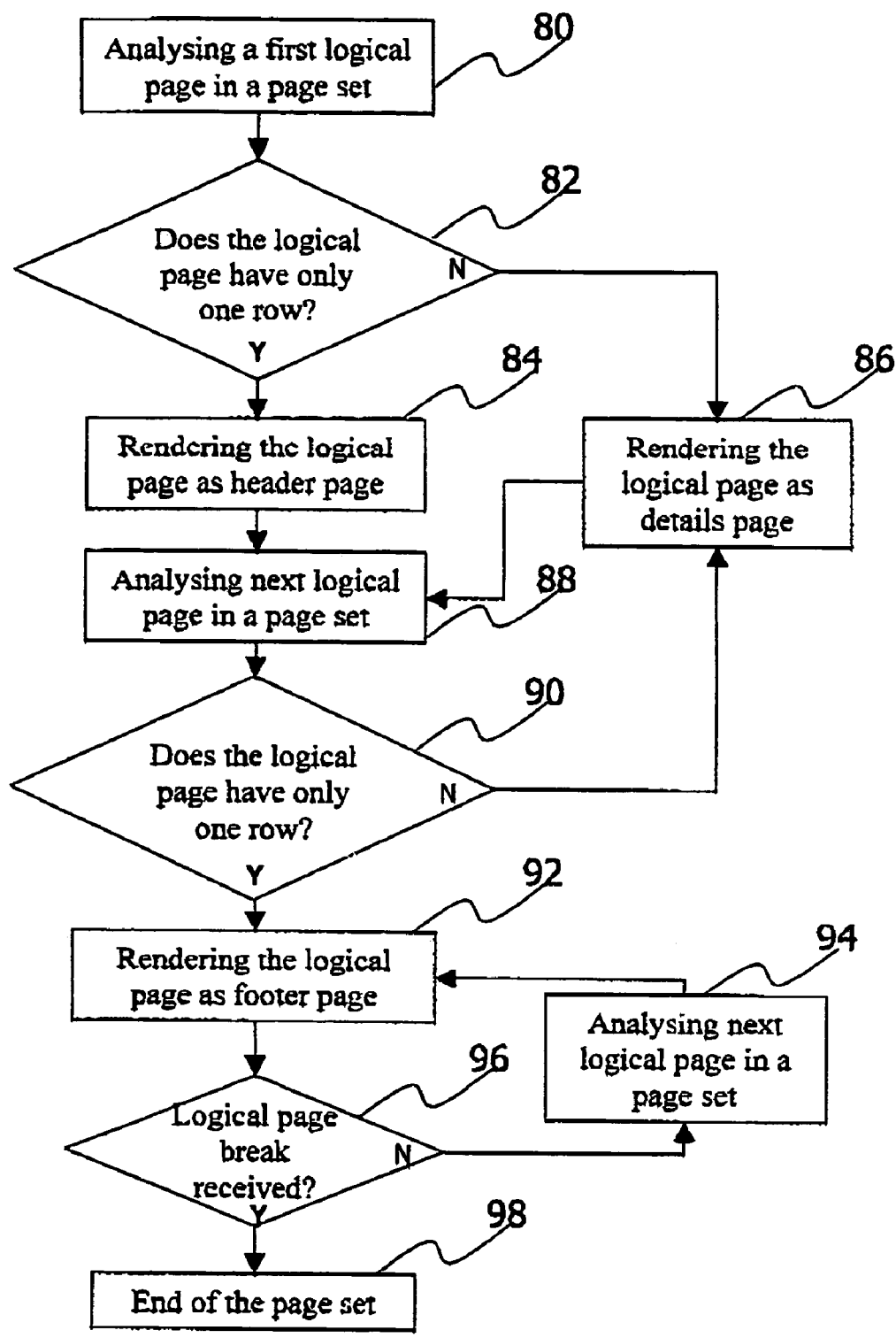
FIG. 4 shows a flowchart of the process of rendering a page set.

FIG. 4 describes one embodiment of the process of rendering a page set when the information is retrieved from the databases. A first logical page from a page set is analyzed (80) to determine the number of rows in that logical page (82). If there is only one row of data in that logical page, then the logical page is rendered as a logical header page (84). A next logical page from the page set is then analyzed and is rendered as a logical header page until a logical page with more than one row is encountered, this logical page is rendered as a logical details page (86). Subsequent logical pages are rendered as logical details pages (88, 90) until another logical page with one row is encountered (92), this is rendered as logical footer pages. When a logical page break is encountered (96), it is assumed that the end of the page set is reached (98).

The logical pages in a page set has a sequential order, so that the order and the content of the logical header page, logical details page and logical footer page can be easily identified and rendered.

The logical pages in a page set may also have explicit identification attributes which identify a logical page as a logical header page, a logical details page, or a logical footer page. This has the advantage of rendering the logical header page, logical details page, and logical footer page not based on the intrinsic number of rows of the logical pages, so that a logical header page or a logical footer page can have more than one row in one logical page stored in a database. Identifying a logical page can be accomplished, for example, via attribute value on a logical  XML element, or by specifying the  element as the child of another XML element that explicitly identifies its children as either header or footer pages. When explicitly identified as header or footer, the contents of the page are now irrelevant in determining its header or footer status; hence, a set of rows of data can be rendered on header and footer pages instead of simply the first (header) or last (footer) row in the result set.

Referring to FIG. 5, a page set (100) has a logical header page with 20 rows, a logical details page with 28 rows and a logical footer page with 15 rows. The report output page (102) can accommodate physically 65 rows, therefore, the page set (100) can be rendered on one single report output page.

In FIG. 6, a page set (108) has a logical header page with 20 rows, and a logical footer page with 15 rows as in FIG. 5, however, the logical details page in the page set has 55 rows. This page set has to be subdivided and rendered on two report output pages (104, 106). Both report output pages (104, 106) have the logical header page and logical footer page rendered, however, the logical details page is subdivided into two logical details subpages, one with 30 rows and one with 25 rows and rendered sequentially in report output pages 104 and 106. In report output pages 104 and 106, the logical header page and logical footer page are repeatedly rendered as header section and footer section.

Figure 7:
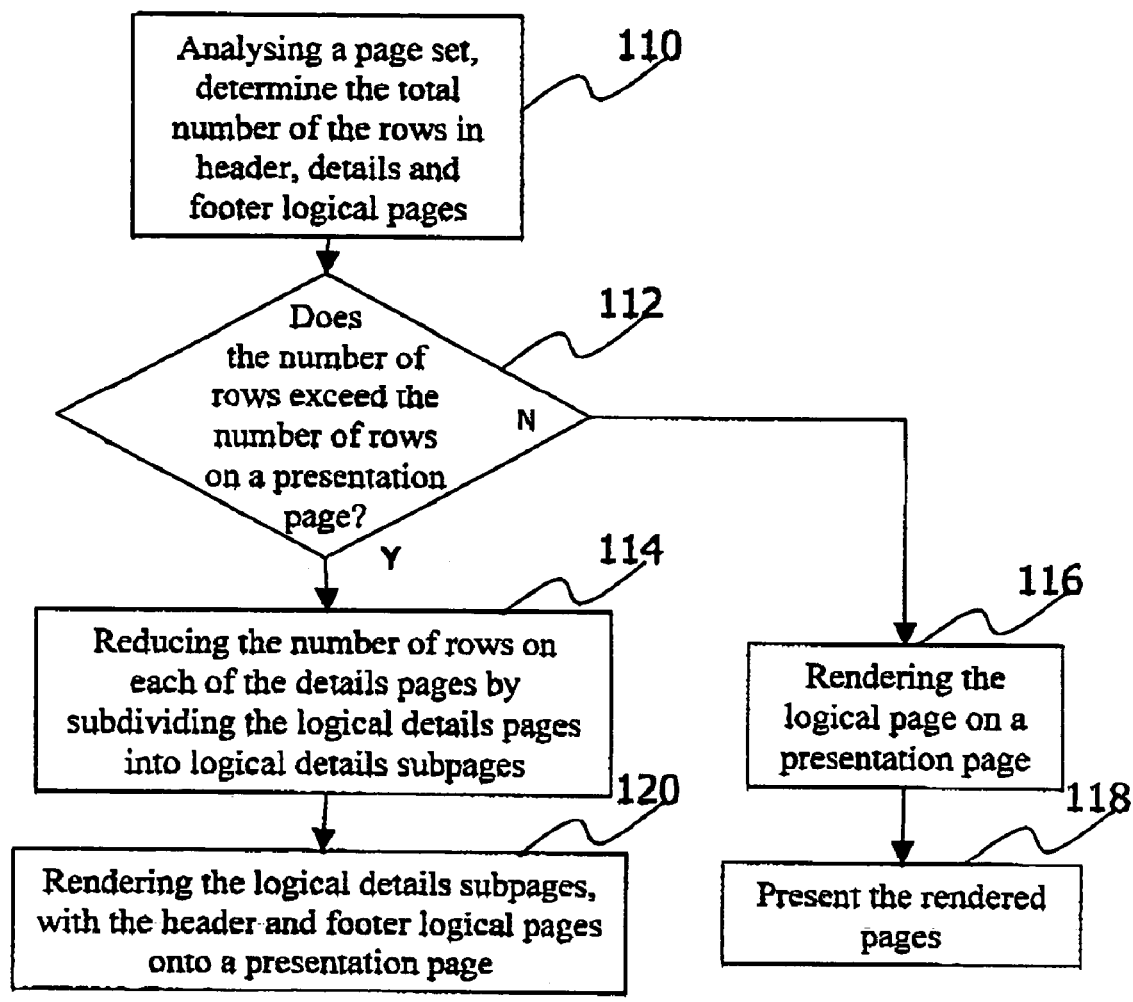
FIG. 7 shows a flowchart of the process of rendering a page set into a report output page.

FIG. 7 shows the steps to render a page set into report output pages. The page set is first analyzed to determine the total number of rows of the logical header page, logical details page, and logical footer page (110). If the total number of the rows of a page set exceeds the number of rows that can be displayed on a report output page, the logical details page are subdivided into logical details subpages (114), which, together with the logical header page and logical footer page, fit into a report output page. The logical details subpages and the logical header page and logical footer page are then rendered together as report output pages (120), such as described in regard to FIG. 6 (104, 106). The most effective way to subdivide the logical details page into logical details subpages is to subtract the numbers of rows for logical header page and logical footer page from the number of rows a report output page can display, to arrive at a subtracted number, and subdivide the logical details page into logical details subpages with row numbers equal to the subtracted number.

If the total number of the rows of a page set does not exceed the number of rows which can be displayed on a report output page (112), the logical header page, logical details page, and logical footer page will be rendered as a report output page (116, 118).

Figure 8:
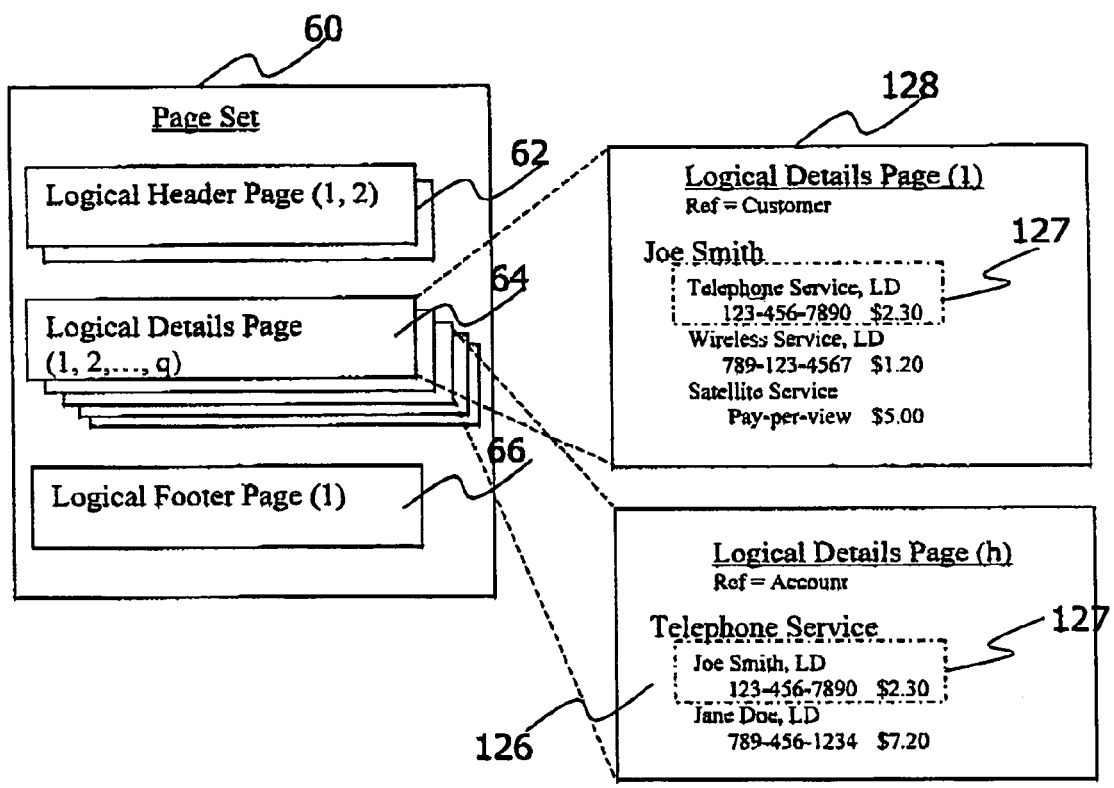
FIG. 8 shows an example of a page set with identical information in different items of the page set.

Referring to FIG. 8, a page set (60) may include logical details pages (126, and 128) referring to same information (127). If displayed in a sequential order, same information (127) may be repeated. The rendering engine shares data between page sets even if they are on different logical pages, to provide support for burst reports (for example, similar content going to several users), and simultaneously rendering the same report in two different output formats (for example, HTML and PDF). This may result in two logical pages of a page set containing the same data returned from the same query.

Figure 9:
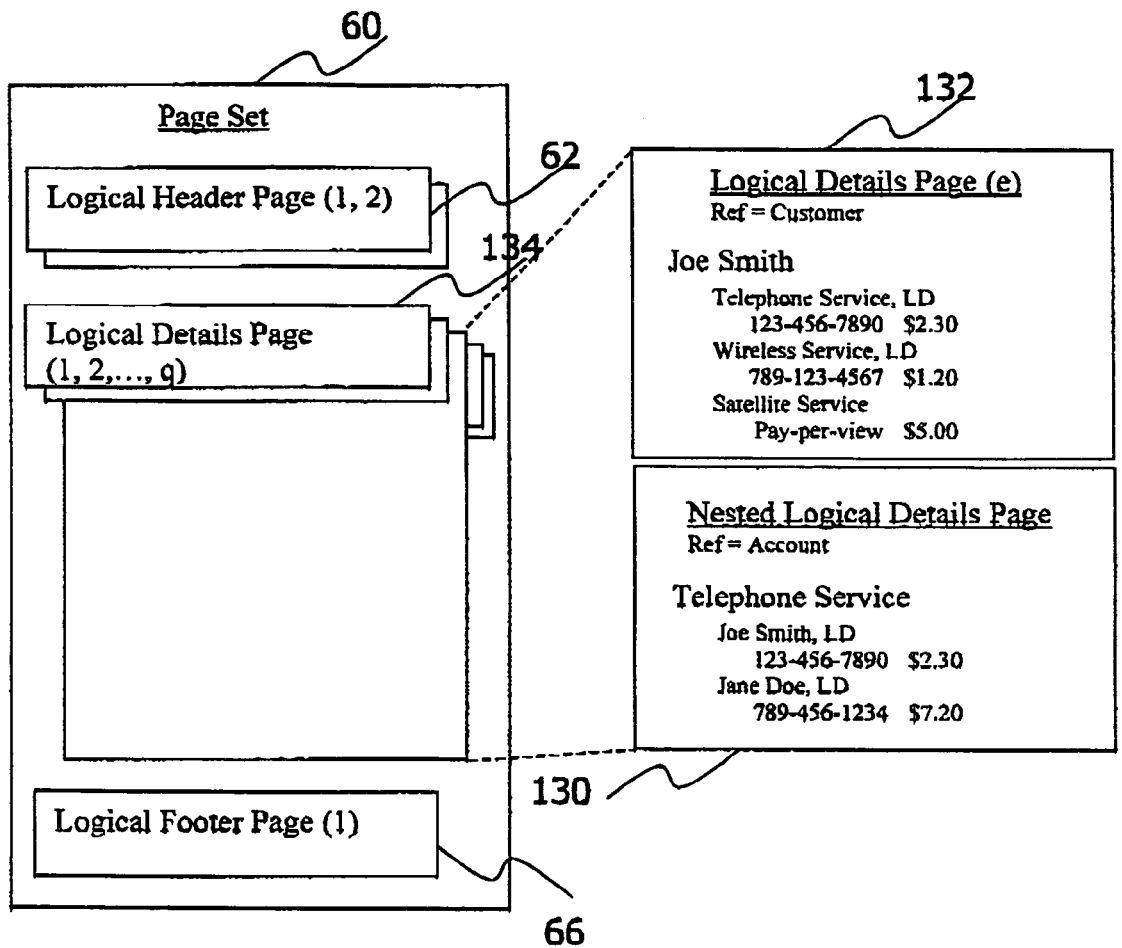
FIG. 9 shows an example of a nested page set.

A nested logical details page is illustrated in FIG. 9 to overcome this duplication. In a nested logical page set (60), one of the logical page sets is assigned a higher level, in FIG. 9, the page set 60 has a higher level, and a second logical details page is assigned a lower level, in this case, the nested logical details pages 127 and 128. When a nested page set is rendered, only the logical details page with the lowest level has all information rendered on a report output page. Nesting of page sets is used to trigger rendering of subordinate page sets within the header and footer pages of higher level page sets. In FIG. 2, the utility bill example shows logical header (44) and footer (52, 53) pages respectively in the customer page set (41, 45, 53), and a nested page set for each account: Current Charges (46), Phone Service (48) and Wireless (50). The account page set likely contains just one logical details page and no headers (40, 42) or footers (52, 54).

The present invention has been described with regard to one or more embodiments. However, it will be apparent to persons skilled in the art that a number of variations and modifications can be made without departing from the scope of the invention as defined in the claims.

What is claimed is:

1. A method of rendering a page set having sequential logical pages to generate and display a report output page comprising the steps of:
   a) determining a number of rows for each of the logical pages in the page set;
   b) identifying the logical pages as a logical header page, a logical details page or a logical footer page;
   c) determining a first number of rows for the report output page;
   d) adding the numbers of rows of the logical header page, the logical details page, and the logical footer page to obtain a first sum;
   e) rendering the logical pages in a predetermined order, if the first number is greater than or equal to the first sum;
   f) adding the rows of the logical header page; and the logical footer page to obtain a second sum;
   g) subtracting the second sum from the first number to arrive at a logical details page displaying number;
   h) subdividing the logical details page, if the first sum is greater than the first number, into logical details subpages having number of rows corresponding to the logical details page displaying number and a sequential order, resulting a last logical details subpage having a number being smaller than or equal to the logical details page displaying number;
   i) rendering the logical header page, logical details subpage, and logical footer page in the predetermined order; and
   j) generating and displaying the report output page.

2. The method according to claim 1, wherein the identifying step is based on attributes.

3. The method according to claim 1, wherein the identifying step is based on an attribute selected from the group consisting of logical header page attribute, logical details page attribute and logical footer page attribute.

4. The method according to claim 1, wherein the predetermined order is: logical header page; logical details page and logical footer page.

5. The method according to claim 1, wherein the logical details page further comprises nested logical details pages, said nested logical details pages having levels assigned.

6. The method according to claim 5, wherein only details of the lowest level nested logical details page is rendered.

7. The method according to claim 1, wherein the page set is derived from business intelligence data.

8. The method according to claim, wherein the report output page is generated and displayed onto paper.

9. The method according to claim 1, wherein the report output page is generated and displayed through a computer application.

10. The method according to claim 1, wherein the report output page is generated in a markup language and displayed through a computer application.

11. The method according to claim 1, wherein the logical page comprises graphics.

12. The method according to claim 1, wherein the report output page is selected from a group consisting of a printed paper page an HTML web page, a file encoded in a markup language output though a computer application, a page presented on a display, a page using a encapsulated file type, and a combination thereof.

13. A system for rendering a page set having sequential logical pages to generate and display a report output page comprising:
   a) module for determining a number of rows for each of the logical pages In the page set;
   b) module for identifying the logical pages as a logical header page, a logical details page or a logical footer page;
   c) module for determining a first number of rows for the report output page;
   d) module for adding the numbers of rows of the logical header page, the logical details page, and the logical footer page to obtain a first sum;
   e) module for rendering the logical pages in a predetermined order, if the first number is greater than or equal to the first sum;
   f) module for adding the rows of logical header page; and logical footer page to obtain a second sum;
   g) module for subtracting the second sum from the first number to arrive at a logical details page displaying number;
   h) module for subdividing the logical details page, if the first sum is greater than the first number, into logical details subpages having number of rows corresponding to the logical details page displaying number and a sequential order, resulting a last logical details subpage having a number being smaller than or equal to the logical details page displaying number;
   i) module for rendering the logical header page, the logical details subpages, and the logical tooter page in the predetermined order; and
   j) module for generating and displaying the report output page.

14. The system according to claim 13, wherein the logical pages have identification attributes.

15. The system according to claim 14, wherein the identification attribute is for a logical page selected from the group consisting of logical header page, logical details page and logical footer page.

16. The system according to claim 13, wherein the predetermined order is: logical header page; logical details page; and logical footer page.

17. The system according to claim 13, wherein the logical details page further comprises nested logical details pages, said nested logical details pages having levels assigned.

18. The system according to claim 13, wherein the report output page is selected from a group consisting of a printed paper page, an HTML web page, a file encoded in a markup language output though a computer application, a page presented on a display, a page using a encapsulated file type, and a combination thereof.

19. A computer program product comprising:
a memory having microcontroller-readable code embedded therein for rendering a page set having sequential logical pages for generating and dissolving a report output page, the code comprising:
  a) code means for determining a number of rows for each of the logical pages in the page set;
  b) code means for identifying the logical pages as a logical header page, a logical details page or a logical footer page;
  c) code means for determining a first number of rows for the report output page;
  d) code means for adding the number of rows of the logical header page; the logical details page; and the logical footer page to obtain a first sum;
  e) code means for rendering the logical pages in a predetermined order, if the first number Is greater than or equal to the first sum;
  f) code means for adding the rows of the logical header page; and the logical footer page to obtain a second sum;
  g) code means for subtracting the second sum from the first number to arrive a logical details page displaying number;
  h) code means for subdividing the logical details page, if the first sum is greater than the first number, into logical details subpages having number of rows corresponding to the logical details page displaying number and a sequential order, resulting a last logical details subpage having a number being smeller than or equal to the logical details page displaying number;
  i) code means for rendering the logical header page, the logical details subpage, and the logical footer page in the predetermined order; and
  j) code means for generating and displaying the report output page.

20. The computer program product according to claim 19, wherein the logical pages have identification attributes.

21. The computer program product according to claim 20, wherein the identification attribute is for a logical page selected from the group consisting of logical header page, logical details page and logical footer page.

22. The computer program product according to claim 19, wherein the predetermined order is: logical header page; logical details page; and logical footer page.

23. The computer program product according to claim 19, wherein the logical details page further comprises nested logical details pages, said nested logical details pages having levels assigned.

24. The computer program product according to claim 19, wherein the report output page is selected from a group consisting of a printed paper page, art HTML web page a file encoded in a markup language output though a computer application, a page presented on a display, a page using a encapsulated file type, and a combination thereof.

* * * * *